Nov. 20, 1928.  S. BABITZKY ET AL  1,692,022
MIXING MACHINE
Filed June 25, 1924

Inventors
Samuel Babitzky
and Vicent Mathe
by Daniel F. Brennan
Attorney

Patented Nov. 20, 1928.

1,692,022

UNITED STATES PATENT OFFICE.

SAMUEL BABITZKY AND VINCENT MATHE, OF CHICAGO, ILLINOIS.

MIXING MACHINE.

Application filed June 25, 1924. Serial No. 722,306.

The invention relates to mixing machines and more particularly to machines for mixing candy.

An object of the invention is to provide a mixer that will have no mechanism or moving parts adjacent or above the top, thus avoiding accidents, making contents accessible and obviating the danger of grease and dirt from inadvertently dropping into the mixer and contaminating the contents.

Another object of the invention is to provide a machine in which the driving shaft mounted within the kettle of the mixer will not come in contact with its contents but will be encased by a noncorrosive cover.

Another object of the invention is to provide means for discharging the candy conveniently and avoiding the usual practice of having the candy or contents discharged through a tube leading to the floor below that on which the mixer is installed.

Figure 1:
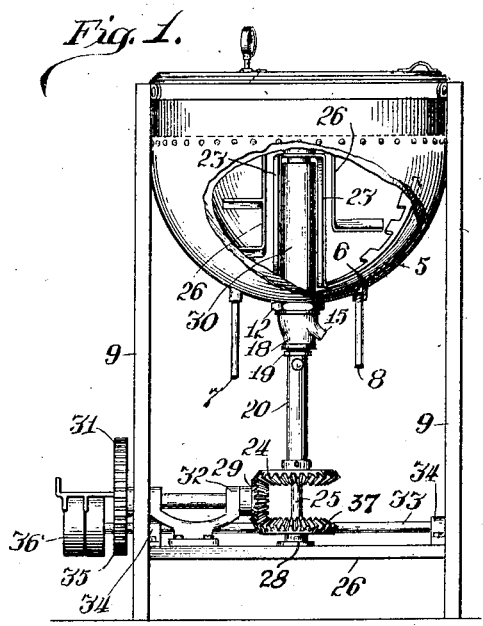
Fig. 1 is a view in elevation of a machine embodying features of the present invention, parts of said machine being broken away to clarify the showing.
Figure 3:
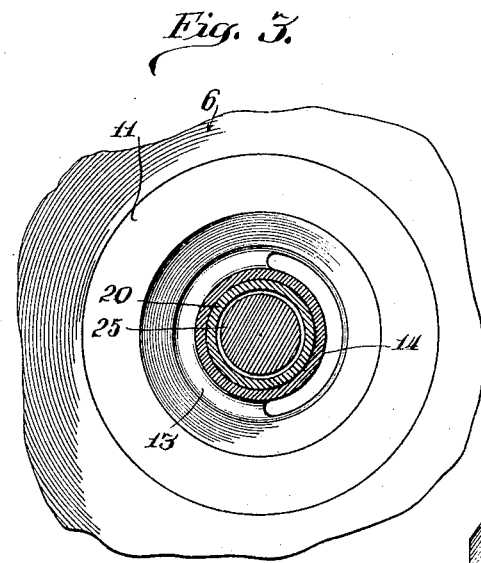
Fig. 3 is a cross-section taken on line A—A of Figure 2.
Figure 2:
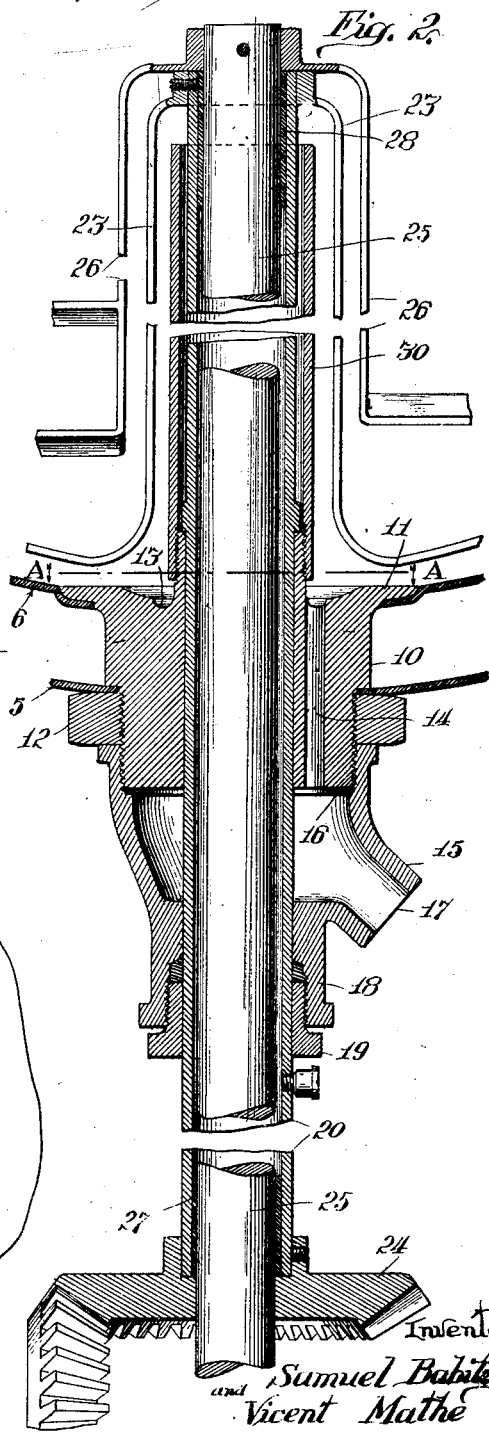
Fig. 2 is an assembled elevation with parts broken away.

A mixing chamber or kettle is formed of an outer shell 5 preferably semi-spherical in form at the bottom end and extending upwardly forming a cylindrical rim, and an inner shell 6 spaced from said outer shell and stopping short of the top and bent to form a closure for the space between the walls, thus making it steam tight.

An inlet 7 and an outlet 8 are provided at the bottom of the shell for the entrance and exit of a heating medium such as steam.

Equally spaced standards 9 are securely fastened to the upper edge of the mixing chamber or kettle and extend downwardly to provide a support therefor.

An outlet spacer 10 extends outwardly from the center of the inner shell or wall, said shell being provided with an annular depression to receive and engage a flange 11 on said spacer 10 provided for that purpose, thus leaving it flush with the inner surface of the kettle to facilitate the complete discharge of the contents. The lower end of spacer 10 is of reduced diameter to form a shoulder for the outer shell to abut against, and a lock-nut 12 has threaded engagement with spacer 10 to firmly hold the outer and inner shells in spaced relation. The upper end of spacer 10 is of greatly reduced diameter, is externally threaded, and an annular groove 13 is provided to bring the lowest point adjacent and in connection with an opening 14 which extends through the spacer.

A tubular outlet 15 is provided with internal threads which engage with the external threads of spacer 10 and a gasket 16 is inserted and rests on a shoulder within connection 15 to make the union secure.

A valve (not shown) may be secured to the branch 17 of the tubular outlet to control the discharge of the contents. The lower end 18 is internally threaded to receive a stuffing box gland 19 and any desirable packing may be placed between the gland and the outlet connection 15.

A hollow shaft 20 extends rotatably through the bore of the gland 19 upwardly through the central bore of spacer 10 and is provided with an annular enlargement which rests on the upwardly extending portion of member 10, and then extends upwardly into the mixing kettle and has an agitator 23 secured thereto by a headless set screw in a collar integral with said agitator and provided with a suitable bore.

A bevel gear 24 is securely fastened to the end of said hollow shaft by a headless set screw or the like.

A solid shaft 25 extends through said hollow shaft and has an agitator 26 secured to its upper end by means of a cotter-pin which passes through a collar integral with the agitator and through the shaft.

A bushing 27 is inserted between the shafts to hold them in spaced alignment and said bushing in turn is held against axial displacement by a counterbore in the bevel gear 24.

Another bushing 28 is inserted between the shafts at the upper end and held against axial displacement by a headless set screw which engages agitator, hollow shaft and bushing.

A sleeve 30 is in threaded engagement with member 10 and extends upwardly to form a shield for the revolving parts to prevent the contents of the mixer kettle from coming in contact therewith.

Braces 26 secured near their base hold standards 9 firmly together and form a support for the driving mechanism.

Another bevel gear 37 is secured to the bottom of solid shaft 25 by means of a cotter-pin and is mounted in a thrust bearing 28 secured to a cross-brace.

A pinion gear 29 is in mesh with gears 24 and 37 and a counter-shaft extends from said pinion and has a spur gear 31 secured to its other end.

A bearing 32 mounted on cross-brace has spaced arms one of which abuts each of the gears 29 and 31, holding them against axial displacement.

A shaft 33 is mounted in bearings on a cross-brace 26 and has a pinion 35 mounted thereon to mesh with gear 31. A tight and loose pulley 36 is secured to the extreme end of the shaft 33 to connect with a source of power.

It is to be noted that due to the arrangement of the bevel gears that the shafts 25 and 20 will revolve clockwise and counter-clockwise respectively and thus rotate the agitators in opposite directions.

The top of the mixer is provided with a cover having a heat gauge mounted thereon to determine the temperature without removing the cover and inserting a thermometer into the mixture as has heretofore been done.

Having described our invention, we claim:

1. In a mixing machine, a pair of spaced shells, a closure for said shells, a spacer element disposed centrally of said shells at the bottom thereof, agitator driving means journaled in said element, and extending into said shells, means carried by said element for preventing the contents of said shells from coming in contact with said agitator driving means, and liquid withdrawing means associated with said element, said liquid withdrawing means communicating with said inner shell through said element.

2. In a mixing machine, the combination with standards, of an outer shell supported thereon, an inner shell spaced from said outer shell, a spacer element disposed centrally of said shells at the bottom thereof, a pair of relatively rotating shafts journaled in said spacer element, and extending into said shells, means carried by said element at the upper portion thereof for preventing the contents of said shells from coming in contact with said rotating shafts, agitators mounted on said shafts within said shells, an outlet extending axially of said shafts in threaded engagement with said spacer element, and a passage in said spacer element establishing communication between said inner shell and outlet.

3. In a mixing machine, a pair of spaced shells, a chamber separating said shells adapted to receive a heating medium, a closure for said shells, a spacer element disposed centrally of said shells at the bottom thereof, a pair of relatively rotating shafts journaled in said spacer element, and extending into said inner shell, a member carried by said spacer element surrounding the portion of said shafts within the inner shell for preventing the contents of said inner shell from coming in contact with said shafts, agitators mounted on said shafts, and means associated with said spacer element, effective to enable the withdrawal of liquid received by said inner shell through said spacer element.

4. In a mixing machine, the combination with standards, a substantially circular member carried by said standards, a shell having a peripheral rim supported by said circular member, another shell conforming in shape with said first named shell received therein in spaced relation to receive a heating medium intermediate its walls, a spacer element associated with said shells, driving means journaled in said element, and extending into said shells, means within said shells for preventing the contents of said shells from coming in contact with said driving means, agitators conforming in shape with said shells mounted on said driving means within said shells, and means for selectively withdrawing the contents of said inner shell through said spacer element.

5. In a mixing machine, the combination with standards, a substantially circular member carried by said standards, a shell having a peripheral rim supported by said circular member, another shell conforming in shape with said first named shell received therein in spaced relation to receive a heating medium intermediate its walls, a spacer element associated with said shells, driving means journaled in said element, and extending into said shells, means carried by said spacer element and surrounding the portion of said driving means within said shells for preventing the same from coming in contact with the contents within the shells, agitators conforming in shape with said shells mounted on said driving means within said shells, and means for selectively withdrawing the contents of said inner shell through said spacer element, said content withdrawing means comprising a tubular member in threaded coaxial engagement with said spacer element, said tubular member having an angularly disposed outlet.

6. In a mixing machine, a pair of spaced shells, a spacer element engaging the shells at the bottom thereof, and provided with a bearing opening and a discharge opening at one side of the bearing opening, a cup shaped member depending from the spacer element and arranged to catch the batch passing through the discharge opening, means for withdrawing the batch from the cup shaped member, and agitator means in the innermost shell, and including drive means passing centrally through the cup shaped member and bearing opening, said drive means extending into the inner-most shell and being surrounded by a casing for preventing the same from coming in contact with the contents in the shell.

7. In a mixing machine, a pair of spaced shells, a spacer element disposed centrally of the bottom of the shells, shafts extending through said spacer, agitators on said shafts within the shells, a tubular extension on said spacer extending inwardly and surrounding said shafts to prevent the contents of the shell from contacting said shafts, said spacer element having an opening extending therefrom to permit discharge of the contents.

8. In a mixing machine, an inner shell, an outer shell surrounding and spaced from the inner shell, a spacer element disposed centrally of the bottom of the shells to maintain them in spaced relation, an outlet in said spacer, shafts extending through the spacer into the interior of the inner shell and having agitator blades thereon, and a sleeve on said bearing surrounding the shafts on the interior of the shells to prevent the contents thereof from contacting the shafts.

9. In a mixing machine, a pair of spaced shells, a spacer element disposed centrally of the bottom of the shells and having portions extending vertically therefrom, said spacer having a vertical bore and an outlet opening therein, shafts extending through said bore into the interior of the shells, agitators mounted on the top of said shafts and extending downward to conform to the curvature of the bottom of the shells, a sleeve member mounted on one of the extensions of the spacer member and surrounding the shafts, the other of said extensions having a cup shaped tubular member threaded thereon, and an outlet in said tubular member to facilitate the withdrawal of the contents.

10. In a mixing machine, a pair of spaced shells, a spacer element disposed centrally of the bottom of said shells, shafts extending through said spacer, one of said shafts being tubular and having the other shaft extending therethrough, agitators on said shafts within the shell, means outside said spacer and shells for admitting a lubricant between the said shafts, a tubular extension on said spacer extending inwardly and surrounding said shafts to prevent the contents of the shell from contacting said shafts, said spacer element having an opening extending therefrom to permit discharge of the contents.

In testimony whereof we affix our signatures at 10 South La Salle Street, Chicago, Illinois.

SAMUEL BABITZKY.
VINCENT MATHE.